United States Patent
Yang et al.

(10) Patent No.: US 6,914,028 B2
(45) Date of Patent: Jul. 5, 2005

(54) METHOD FOR PRODUCING A CATALYST FOR HOMO-OR CO-POLYMERIZATION OF ETHYLENE

(75) Inventors: Chun-Byung Yang, Daejon (KR); Sang-Yull Kim, Daejon (KR); Weon Lee, Daejon (KR)

(73) Assignee: Samsung Atofina Co., Ltd., Chungnam (KR)

( * ) Notice: Subject to any disclaimer, the term of this patent is extended or adjusted under 35 U.S.C. 154(b) by 0 days.

(21) Appl. No.: 10/416,692

(22) PCT Filed: Nov. 9, 2001

(86) PCT No.: PCT/KR01/01905

§ 371 (c)(1), (2), (4) Date: Oct. 27, 2003

(87) PCT Pub. No.: WO02/38620

PCT Pub. Date: May 16, 2002

(65) Prior Publication Data

US 2004/0053774 A1 Mar. 18, 2004

(30) Foreign Application Priority Data

Nov. 10, 2000 (KR) .................................... 2000-0066672

(51) Int. Cl.$^7$ ........................... B01J 31/00; B01J 37/00; C08F 4/02; C08F 4/60
(52) U.S. Cl. ....................... 502/125; 502/127; 502/128; 502/134
(58) Field of Search ............................... 502/125, 127, 502/128, 134, 118, 150, 158, 159, 169, 171, 172

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyota et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scatt et al. |
| 4,226,963 A | 10/1980 | Giannini et al. |
| 4,235,747 A | 11/1980 | Leung |
| 4,263,169 A | 4/1981 | Scata et al. |
| 4,277,372 A | 7/1981 | Matlack |
| 4,315,835 A | 2/1982 | Scatt al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |

(Continued)

FOREIGN PATENT DOCUMENTS

| | | |
|---|---|---|
| DE | 51136625 | 11/1976 |
| DE | 2553104 | 6/1977 |
| DE | 52111528 | 9/1977 |
| DE | 3636060 | 5/1988 |
| EP | 0 008 307 | 3/1980 |
| EP | 0131832 | 7/1984 |
| EP | 0350170 | 1/1990 |
| EP | 0385765 | 9/1990 |
| EP | 0 391 336 | 10/1990 |
| EP | 0602922 | 6/1994 |
| EP | 0606125 | 7/1994 |
| EP | 0607703 | 7/1994 |
| EP | 0669347 | 8/1995 |
| GB | 1335887 | 10/1973 |

(Continued)

OTHER PUBLICATIONS

Wen et al. "Mechanics of Fluidization" Chemical Engineering Progress Symposium Series, 1962, vol. 62, 100–111.

Edelmann, "N–silylated benzamidines: versatile building blocks in main group and coordination chemistry," Coordination Chemistry Reviews, vol. 137, 1994, pp. 403–481.

Stokes et al., "Reactions of Cobaloxime Anions and/or Hydrides with Enynes as a New, General Route to 1, 3– and 1,2–Dienylcobaloxime Complexes," Organometallics, 1996, vol. 15, pp. 2624–2632.

(Continued)

Primary Examiner—Mark L. Bell
Assistant Examiner—J. Pasterczyk
(74) Attorney, Agent, or Firm—Meyertons, Hood, Kivlin, Kowert & Goetzel, P.C.; Eric B. Meyertons

(57) ABSTRACT

A method of making an olefin polymerization catalyst is disclosed. The method first combines a magnesium halide with an alcohol, then adds a hydroxylated ester and a silicon alkoxide, followed by a titanium compound and another silicon compound to result in a solid composition. This solid composition is then reacted with an aluminum compound and an alkyl halide, followed by reaction with a second titanium compound which may be the same as or different from the first. The second silicon compound is preferably a silicon halide, and the titanium compounds are preferably halides and alkoxides. The aluminum compounds preferably have chloride and alkyl ligands bonded to them.

8 Claims, No Drawings

U.S. PATENT DOCUMENTS

| | | | |
|---|---|---|---|
| 4,390,671 A | 6/1983 | Imai et al. |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,615,831 A | 10/1986 | Kanno et al. |
| 4,642,328 A | 2/1987 | Morterol et al. |
| 4,673,719 A | 6/1987 | Kioka et al. |
| 4,729,854 A | 3/1988 | Miyata et al. |
| 4,761,392 A | 8/1988 | Shiga et al. |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbé |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,021,382 A | 6/1991 | Malpass, Jr. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,218,052 A | 6/1993 | Cohen et al. |
| 5,244,996 A | 9/1993 | Kawasaki et al. |
| 5,346,872 A | 9/1994 | Menon et al. |
| 5,438,110 A | 8/1995 | Ishimaru et al. |
| 5,439,995 A | 8/1995 | Bailly et al. |
| 5,455,316 A | 10/1995 | Tsutsui et al. |
| 5,459,116 A | 10/1995 | Ro et al. |
| 5,498,770 A | 3/1996 | Hosaka et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,618,886 A | 4/1997 | Shinozaki et al. |
| 5,629,390 A | 5/1997 | Nishimura et al. |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,877,265 A | 3/1999 | Toida et al. |
| 5,880,056 A | 3/1999 | Tsutsui et al. |
| 5,936,049 A | 8/1999 | Kojoh et al. |
| 5,948,872 A | 9/1999 | Kioka et al. |
| 5,965,478 A | 10/1999 | Goto et al. |
| 5,968,862 A | 10/1999 | Abbott et al. |
| 6,028,149 A | 2/2000 | Luciani et al. |
| 6,034,025 A | 3/2000 | Yang et al. |
| 6,066,702 A | 5/2000 | Ro et al. |
| 6,111,038 A | 8/2000 | Kioka et al. |
| 6,114,276 A | 9/2000 | Kong et al. |
| 6,214,759 B1 | 4/2001 | Chang et al. |
| 6,218,331 B1 | 4/2001 | DiMaio et al. |
| 6,235,854 B1 | 5/2001 | Kioka et al. |
| 6,291,385 B1 | 9/2001 | Lee et al. |
| 6,323,150 B1 | 11/2001 | Kojoh et al. |
| 6,482,764 B1 | 11/2002 | Chang et al. |
| 6,521,560 B1 | 2/2003 | Kojoh et al. |
| 6,537,942 B2 | 3/2003 | Shinozaki et al. |
| 6,559,250 B2 | 5/2003 | Ro et al. |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Ro et al. |

FOREIGN PATENT DOCUMENTS

| | | |
|---|---|---|
| GB | 1492618 | 1/1975 |
| GB | 1577643 | 10/1980 |
| JP | 59-064602 | 4/1984 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-191811 | 9/1988 |
| JP | 63-54004 | 10/1988 |
| JP | 63308003 | 12/1988 |
| JP | 1242605 | 9/1989 |
| JP | 2240145 | 9/1990 |
| JP | 2-300206 | 12/1990 |
| JP | 06-340711 | 5/1993 |
| JP | 07-330675 | 8/1995 |
| JP | 7242706 | 9/1995 |
| JP | 8109215 | 4/1996 |
| JP | 9165478 | 6/1997 |
| JP | 09176226 | 7/1997 |
| JP | 2000191845 | 7/2000 |
| KR | 1020010084520 | 9/2001 |
| WO | WO 9844009 | 10/1998 |
| WO | WO 00/73355 | 7/2000 |
| WO | WO 01/32718 | 5/2001 |
| WO | WO 01/78687 | 10/2001 |
| WO | WO 02/38619 | 5/2002 |
| WO | WO 02/38622 | 5/2002 |
| WO | WO 02/38623 | 5/2002 |
| WO | WO 02/38624 | 5/2002 |
| WO | WO 02/48206 | 6/2002 |
| WO | WO 02/051882 | 7/2002 |
| WO | WO 02/051933 | 7/2002 |
| WO | WO 02/051934 | 7/2002 |
| WO | WO 02/052059 | 7/2002 |
| WO | WO 03/000747 | 3/2003 |

OTHER PUBLICATIONS

Zhou et al., "Synthesis and Structure of Novel Bridged Dinuclear Indium Complexes," Inorg. Chem., 1996, vol. 35, pp. 1423–1424.

Tinkler et al., "Polymerization of ethene by the novel titanium complex [Ti(Me3SiNCH2CH2NsiMe3)CI2]; a metallocene analogue," Chem. Commun., 1996, pp. 2623–2624.

Linden et al., "Polymerization of a–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Zhou et al., "Bulky Amidinate Complexes of Tin(IV). Synthesis and Structure of Sn(RNC(R')NR)2C22 (R=Cyclohexyl, R'=H, Me; R=SiMe3, R'=tBu)," Inorg. Chem., 1997, vol. 36, pp. 501–504.

Averbuj et al. "Stereoregular Polymerization of a–Olefins Catalyzed by Chiral Group 4 Benzamidinate Complexes of C1 and C3 Symmetry" J. Am. Chem. Soc,1998, vol. 120, 8640–8646.

International Search Report PCT/KR01/01905, mailed Jan. 10, 2002.

METHOD FOR PRODUCING A CATALYST FOR HOMO-OR CO-POLYMERIZATION OF ETHYLENE

TECHNICAL FIELD

The preset invention provides a method for producing a catalyst for homo- or co-polymerization of ethylene, or more particularly a method for producing a titanium solid complex catalyst supported on a carrier containing magnesium, wherein said catalyst has a very high catalytic activity and superior catalyst morphology.

BACKGROUND OF THE INVENTION

Catalysts containing magnesium for polymerization or co-polymerization of ethylene are known to have very high catalytic activities and to accord polymers of high bulk density, which are suitable for liquid phase or gas phase polymerization. By liquid phase polymerization of ethylene, it denotes a polymerization process performed in a medium such as bulk ethylene, isopentane, or hexane, and as for the important characteristics of catalysts used therein, in consideration of the applicability to the process, there are as follows: high catalytic activity, bulk density of the resultant polymers, and the content of low molecular weight molecules of the resultant polymers soluble in a medium. Among these, the catalytic activity is to be the most important characteristic of a catalyst.

Many of the titanium-based catalysts containing magnesium for olefin polymerization, and the manufacturing methods thereof have been reported. Especially, many processes making use of magnesium solutions to obtain catalysts which can generate olefin polymers of high bulk apparent density have been known. There is a means of obtaining a magnesium solution by reacting magnesium compounds with such electron donors as alcohol, amine, cyclic ether, or organic carboxylic acid in the presence of a hydrocarbon solvent. As for the cases of use of alcohol, they are disclosed in U.S. Pat. Nos. 4,330,649, and 5,106,807. Further, the methods for production of catalysts containing magnesium by reacting said liquid-phase magnesium solution with a halogenated compound such as titanium tetrachloride are well known. Such catalysts provide high bulk density to the resultant polymers, but there is much yet to be improved with respect to their catalytic activities, and there are production disadvantages, such as its production of a large amount of hydrogen chloride during the production of catalysts.

U.S. Pat. No. 5,459,116 reported a method of production of a titanium solid catalyst by contact-reacting a magnesium solution containing an ester having at least one hydroxy group as an electron donor with a titanium compound. By this method, it is possible to obtain a catalyst of high polymerization activity, which accords high bulk density to resultant polymers, but there is room for yet more improvements.

U.S. Pat. No. 4,843,049 reported a method for producing a catalyst of high titanium content by reacting titanium alkoxide with a magnesium chloride-ethanol carrier produced by means of a spray-drying method, and then reacting thereto diethylaluminium chloride or ethylaluminium sequischloride. However, there are disadvantages in that the method results in alcohol content which is outside the range of 18~25%, or deterioration of bulk density of polymers thus produced when compounds other than diethylaluminium chloride or ethylaluminium sesquichloride are used.

U.S. Pat. Nos. 5,726,261 and 5,585,317 disclose a method for producing a catalyst having porosity of 0.35~0.7 by heat treating a magnesium chloride-ethanol carrier produced by means of a spray-drying method, or by heat treating the same, followed by treatment with triethylaluminium, and then treating thereto a titanium alkoxide, or titanium alkoxide along with silicone tetraethoxide, etc., by which a titanium-based compound having at least one titanium-halogen and at least one alkoxy group is then supported.

As shown above, there is a need for the development of new catalysts for homo-polymerization or co-polymerization of ethylene for producing polymers with the following characteristics: a simple manufacturing process, high polymerization activity, and high bulk density for polymers by means of controlling the catalyst particles. In the present invention, therefore, it is intended to provide a method for producing, from low-cost compounds via a simple process, a catalyst having excellent catalytic activity, capable of producing polymers of high bulk density for polymers by means of controlling the morphology of catalyst particles. Further, the specific production process of catalysts and the steps thereof as disclosed in the present invention have never been reported in the prior art.

SUMMARY OF THE INVENTION

Consequently, the objective of the present invention is to provide a new method for producing a catalyst for homo- or co-polymerization of ethylene, wherein said catalyst has enhanced catalytic activity, which is capable of producing polymers of high bulk density. Still other objectives and the utility of the present invention will become apparent as references are made with respect to the following descriptions and the claims thereto.

DETAILED DESCRIPTION OF THE PREFERRED EMBODIMENTS

The catalyst for homo-polymerization or co-polymerization of ethylene according to the present invention is produced by a simple yet efficient manufacturing process, which comprises (i) preparing a magnesium solution by contact-reacting a halogenated magnesium compound with alcohol; (ii) producing a solid component of controlled particles morphology by reacting said solution with an ester compound containing at least one hydroxy group and a silicone compound containing an alkoxy group, and then adding thereto a mixture of a titanium compound and a silicon compound; and (iii) reacting thereto an aluminium compound, a haloalkane compound, either in conjunction or in sequence, and then reacting thereto a titanium compound.

Types of halogenated magnesium compounds used in the present invention are as follows: di-halogenated magnesiums such as magnesium chloride, magnesium iodide, magnesium fluoride, and magnesium bromide; alkymagnesium halides such as methylmagnesium halide, ethylmagnesium halide, propylmagnesium halide, butylmagnesium halide, isobutylmagnesium halide, hexylmagnesium halide, and amylmagnesium halide; alkoxymagnesium halides such as methoxymagnesium halide, ethoxymagensium halide, isopropoxymagnesium halide, butoxymagnesium halide, octoxymagnesium halide; and aryloxymagnesium halides such as phenoxymagnesium halide and methylphenoxymagnesium halide. Of the above magnesium compounds, two or more compounds can be used in a mixture. Further, the above magnesium compounds can be effectively used in the form of a complex compound with other metals.

Of the compounds listed above, some can be represented by a simple formula, but the others cannot be so represented depending on the production methods of magnesium compounds. In the latter cases, it can be generally regarded as a mixture of some of the listed compounds. For example, the following compounds can be used in the present invention: such compounds obtained by reacting magnesium compounds with polysiloxane compounds, silane compounds containing halogen, ester, or alcohol; and such compounds obtained by reacting magnesium metals with alcohol, phenol, or ether in the presence of halosilane, phosphorus pentachloride, or thionyl chloride. However, the preferable magnesium compounds are magnesium halides, especially magnesium chloride or alkylmagnesium chloride, preferably those having respectively an alkyl group of 1~10 carbons; alkoxymagnesium chlorides, preferably those having respectively 1~10 carbons; and aryloxymagnesium chlorides, preferably those having respectively 6~20 carbons. The magnesium solution used in the present invention can be produced as solution by using the aforementioned magnesium compounds in the presence a hydrocarbon solvent, or in the absence thereof in an alcohol solvent.

As to the types of hydrocarbon solvents used in the present invention, they include aliphatic hydrocarbons such as pentane, hexane, heptane, octane, decane, and kerosene; alicyclic hydrocarbons such as cyclobenzene, methylcyclobenzene, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When a magnesium compound is converted into a magnesium solution, alcohol is used in the presence of the aforementioned hydrocarbons, The types of alcohol include those containing 1~20 carbon atoms, such as methanol, ethanol, propanol, butanol, pentanol, hexanol, octanol, decanol, dodecanol octadecyl alcohol, benzyl alcohol, phenylethyl alcohol, isopropyl benzyl alcohol, and cumylalcohol, although alcohol containing 1~12 carbon atoms is preferable. The average size of a target catalyst and its particle distribution can vary according to the types of alcohol, the total contents, the types of magnesium compounds, and the ratio of magnesium to alcohol, etc. Nevertheless, the total amount of alcohol required to obtain the magnesium solution is at least 0.5 mol per each mole of magnesium compounds, preferably about 1.0~20 mol, or more preferably about 2.0~10 mol.

During the production of magnesium solution, the reaction of a magnesium compound with alcohol is preferably carried out in the presence of a hydrocarbon medium. The reaction temperature, while variable depending on the types and the amount of alcohol, is at least about −25° C., preferably −10~200° C., or more preferably about 0~150° C. It is preferable to carry out the reaction for about 15 minutes~5 hours, preferably for about 30 minutes~4 hours.

Of the electron donors used in the present invention, the ester compounds respectively containing at least one hydroxy group include unsaturated aliphatic acid esters respectively having at least one hydroxy group, such as 2-hydroxy ethylacrylate, 2-hydroxy ethylmethacrylate, 2-hydroxypropyl acrylate, 2-hydroxypropylmethacrylate, 4-hydroxy butylacrylate, pentaerythritol triacrylate; aliphatic monoesters or polyesters respectively containing at least one hydroxy group, such as 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxy methyl) malonate; aromatic esters respectively having at least one hydroxy group, such as 2-hydroxy ethyl benzoate, 2-hydroxy ethyl salicylate, methyl-4-(hydroxy methyl) benzoate, methyl 4-hydroxy benzoate, ethyl 3-hydroxy benzoate, 4-methyl salicylate, ethyl salicylate, phenyl salicylate, propyl 4hydroxy benzoate, phenyl 3-hydroxy naphthanoate, monoethylene glycol monobenzoate, diethylene glycol monobenzoate, triethylene glycol monobenzoate; alicyclic esters respectively having at least one hydroxy group, such as hydroxybutyl lactone, and others. The amount of the ester compound containing at least one hydroxy group should be 0.001~5 mol per mole of magnesium, or preferably 0.01~2 mol per mole of magnesium.

For the silicon compound containing an alkoxy group, which can be used as another electron donor in the present invention, a compound which is represented by a general formula of $R_nSi(OR)_{4-n}$ (here R is a hydrocarbon having 1~12 carbons, while "n" is a natural number from 0 to 3) is preferable. In particular, the following compounds can be used: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltrietoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane, etc. The amount of said compound is preferably 0.05~3 mol per mole of magnesium, or more preferably 0.1~2 mol.

As for the temperature for the contact-reaction of the magnesium solution, an ester compound containing at least one hydroxy group, and an alkoxy silicone compound, the temperature of 0~100° C. is appropriate, or more preferably 10~70° C.

For recrystalization of catalyst particles, the magnesium compound solution obtained as such is reacted with a mixture of a liquid titanium compound represented by a general formula of $Ti(OR)_aX_{4-a}$ (here R is an alkyl group having 1~10 carbon atoms, X a halogen atom, "a" a natural number from 0 to 4) and a compound represented by a general formula of $R_nSiCl_{4-n}$ (here R is a an alkyl group having 1~10 carbons, and "n" a natural number from 0 to 4). The types of titanium compounds which satisfy the general formula include 4-halogenated titanium such as $TiCl_4$, $TiBr_4$, and $TiI_4$; 3-halogenated alkoxy-titanium such as $Ti(OCH_3)Cl_3$, $Ti(OC_2H_5)Cl_3$, $Ti(OC_2H_5)Br_3$, and $Ti(O(i-C_4H_9))Br_3$; 2-halogenated alkoxy-titanium compounds such as $Ti(OCH_3)_2Cl_2$, $Ti(OC_2H_5)_2Cl_2$, $Ti(O(i-C_4H_9))_2Cl_2$, and $Ti(OC_2H_5)_2Br_2$; and tetra-alkoxy titanium such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing respectively halogen, or more preferably titanium tetrachloride.

The types of silicon compounds satisfying the above general formula of $R_nSiCl_{4-n}$ include silicon tetrachloride; trichlorosilanes such as methyltrichlorosilane, ethyltrichlorosilane, phenyltrichlorosilane; dichlorosilanes such as dimethyldichlorosilane, diethyldichlorosilane, di-phenyldichlorosilane, and methylphenyldichlorosilane;

monochlorosilanes such as trimethylchlorosilane; and a mixture of these silicon compounds can also be used in the present invention, or mole preferably silicon tetrachloride can be used.

The amount of mixture of a titanium compound and a silicon compound used during re-crystallization of magnesium compound solution is appropriately 0.1~200 mol per mole of magnesium compounds, preferably 0.1~100 mol, or more preferably 0.2~80 mol. The molar ratio of the titanium compound to the silicon compound in mixture is appropriately 1:0.05~0.95, or more preferably 1:0.1~0.8.

When the magnesium compound solution is reacted with the mixture of a titanium compound and a silicon compound, the morphology and the sizes of the resultant re-crystallized solid constituents vary a great deal according to the reaction conditions. Hence, the reaction of the magnesium compound solution with the mixture of a titanium compound and a silicon compound should be carded out preferably at a sufficiently low temperature to result in formation of solid constituents. More preferably, the reaction should be carried out by contact-reaction at −70~70° C., or most preferably at −50~50° C. After the contact-reaction, the reacting temperature is slowly raised for sufficient reaction for the duration of 0.5~5 hours at 50~150° C.

To the solid component obtained above, an aluminium compound and a haloalkane compound are reacted thereto in conjunction or in sequence to activated the solid component.

The examples of aluminium compounds include a trialkyl aluminium having an alkyl group of 1~6 carbons, such as triethylaluminium and triisobutylaluminium; and an aluminium compound having one or more halogens, such as ethylaluminium dichloride, diethylaluminium chloride, ethyl-aluminium sesquichloride, or the mixture thereof. Moreover, the aluminium compound can be used after dilution if deemed necessary.

A haloalkane compound is a compound having 1~20 carbon atoms and at least one halogen, and the mixture thereof can be used. The examples include monochloromethane, dichloromethane, trichloromethane, tetrachloromethane, monochloroethane, 1,2-dichloroethane, monochloropropane, monochlorobutane, monochloro-secondary-butane, monochloro-tertiary-butane, monochlorocyclohexane, chlorobenzene, monobromomethane, monobromopropane, monobromobutane, and monoiodomethane. When reacting an aluminium compound and a haloalkane, it should be carried out at 0~100° C., or more preferably at 20~80° C.

To the solid component as activated above, the titanium compound is reacted thereto in the end to produce the solid catalyst The titanium compound used at that time is a titanium halide or halogenated alkoxy titanium with an alkoxy functional group of 1~20 carbons. At times, a mixture of these compounds can also be used. Of these compounds, however, a titanium halide or a halogenated alkoxy titanium compound having an alkoxy functional group of 1~8 carbons can be appropriately used, or more preferably a titanium tetrahalide can be used.

The catalyst produced according to the process of the present invention can be utilized for homo- or co-polymerization of ethylene. In particular, the catalyst is used in homo-polymerization of ethylene, and also in co-polymerization of ethylene and α-olefin such as propylene, 1-butene, 1-pentene, 4methyl-1-pentene, or 1-hexene having three or more carbons.

The polymerization reaction in the presence of a catalyst in the present invention is carried out by means of using a catalyst system comprising (i) a solid complex titanium catalyst of the present invention, comprising magnesium, titanium, halogen, and an electron donor, and (ii) organometallic compounds of Groups II or III of the Periodic Table.

In the present invention, the solid complex titanium catalyst constituent can be used as a component in the polymerization reaction after pre-polymerization with ethylene or α-olefin. The pre-polymerization can be carried out in the presence of a hydrocarbon solvent such as hexane, at a sufficiently low temperature, with ethylene or α-olefin under pressure, in the presence of the above catalyst constituent and such organic aluminium compound as triethylaluminium. The pre-polymerization, by maintaining the morphology of catalysts by surrounding the catalyst particles with polymers, is helpful in producing good-quality post-polymerization morphology of polymers. The weight ratio of polymers to catalysts after pre-polymerization is ordinarily 0.1:1~20:1.

The organometallic compound in the present invention can be represented by a general formula of $MR_n$, wherein, M stands for a metal constituent of Group II or IIIA in the Periodic Table, such as magnesium, calcium, zinc, boron, aluminium, and gallium, R for an alkyl group with 1~20 carbons, such as a methyl, ethyl, butyl, hexyl, octyl, or decyl group, and n for the atomic valence of the metal constituent. As for more preferable organometallic compounds, a trialkyl aluminium having an alkyl group of 1~6 carbons, such as triethylaluminium and triisobutylaluminium, or the mixture thereof can be utilized. On occasions, an organic aluminium compound having one or more halogen or hydride groups, such as ethylaluminium dichloride, diethylaluminium chloride, ethylaluminium sesquichloride, or diisobutylaluminium hydride can also be used.

The products obtained by the method of polymerization of the present invention are solid ethylene homo-polymers or the copolymers of ethylene and α-olefin, which have excellent bulk density and fluidity. Since the yields of polymer are sufficiently high, there is no need for the removal of catalyst residues.

The present invention is further described by means of the examples and comparative examples as below but should not be confined or limited to these examples.

EXAMPLE 1

A solid complex titanium catalyst was produced by means of the following three steps:

(i) Step: Production of Magnesium Solution

Into a 1.0L reactor equipped with a mechanical stirrer, replaced with nitrogen atmosphere, 9.5 g of $MgCl_2$ and 400 ml of decane were placed therein. After they were stirred at 300 rpm, 75 ml of 2-ethyl hexanol was added thereto. The temperature was raised to 120° C., and then the reaction was allowed to continue for three hours. The homogenous solution, which was obtained after the reaction, was cooled to room temperature (25° C.).

(ii) Step: Contact-reaction of Magnesium Solution with Ester Containing a Hydroxy Group and Alkoxy Silane Compound, Followed by Treatment of Mixture of Titanium Compound and Silicon Compound To the magnesium solution, cooled to room temperature as above, 1.4 ml of 2-hydroxyethyl methacrylate and 6.0 ml of silicone tetraethoxide were added, and then the reaction was allowed to continue for an hour. Into the above solution, a solution mixture of 50 ml of titanium tetrachloride and 50 ml of silicon tetrachloride was dripped thereto for one hour. After completing the dripping process, the temperature of the reactor was raised to 70° C. and maintained at that temperature for one hour, followed by cooling to room temperature.

(iii) Step: Reacting with Titanium Compound after the Treatment of Aluminium Compound and Haloalkane Compound After stirring, the supernatant of the solution was removed, and the remaining solid layer was continuously instilled with 200 ml of decane (A-1 compound) and 100 ml of diethylaluminium chloride (1.0M; A-2 compound). There, the temperature was raised to 60° C. (A-3 temperature) and maintained thereat for two hours. After the reaction, after stirring, the supernatant of the solution was removed, and 600 ml of chloroform (CHCl$_3$; A-4compound) was added thereto for reaction for one hour. Thereafter, it was cooled to room temperature, and after stirring, the supernatant of the solution was again removed, followed by washing twice with 600 ml of decane. To this, 200 ml of decane and 100 ml of TiCl$_4$ were added, followed by raising the temperature to 100° C. and maintaining thereat for two hours. After the reaction, it was cooled to room temperature and washed with 300 ml of hexane until the removal of free unreacted TiCl$_4$ The titanium content of the catalyst so produced was 6.8 wt %.

Polymerization

A 2-L high-pressure reactor was dried in an oven and assembled while hot. In order to make the inside of the reactor nitrogen atmosphere, nitrogen and vacuum were alternatively manipulated three times in the reactor. It was then instilled with 1,000 ml of n-hexane, after which 1 mmol of triethylaluminium and the above solid catalyst by 0.03 mmol in terms of titanium atoms were added thereto. Then, 2,000 ml of hydrogen was added. The temperature of the reactor was raised to 80° C. while stirring at 700 rpm. The pressure of ethylene was adjusted to 100 psi, and the polymerization was allowed to continue for an hour. After the polymerization, the temperature of the reactor was lowered to room temperature, and an excessive amount of ethanol solution was added to the polymerized matters. The polymer thus produced was collected by separation and was dried in an oven at 50° C. for at least six hours, whereby polyethylene was obtained in the form of white powder.

The polymerization activity (kg of polyethylene divided by gram of catalyst) was calculated as the weight (kg) ratio of the polymers as produced per the amount of catalysts so used (gram of catalyst). The results of polymerization are shown in Table 1, together with the bulk density (g/ml) of the polymers, and the melting index (g/10 minutes).

EXAMPLE 2~9

The precipitant was produced in the same manner as Steps (i) and (ii) of Example 1, and the catalyst was produced in the same method of Step (iii) while changing A-1, A-2 compounds, A-3 temperature and A4 compound as shown in Table 1. The polymerization was carried out as in Example 1, and the results thereof are shown in Table 1.

Comparative Example 1

The precipitant was respectively produced in the same manner as Steps (i) and (ii) of Example 1. After stirring, the supernatant of the solution was removed, and the remaining solid layer was washed twice with 600 ml decane. To this, 200 ml of decane and 100 ml of TiCl$_4$ were added, followed by raising the temperature to 100° C. and maintaining thereat for two hours. After the reaction, it was cooled to room temperature and washed with 300 ml of hexane until the removal of free unreacted TiCl$_4$. The titanium content of the catalyst so produced was 5.4 wt %.

The polymerization was carried out as in Example 1, and the results thereof are shown in Table 1.

Comparative Example 2

The precipitant was respectively produced in the same manner as Steps (i) and (i) of Example 1. After stirring, the supernatant of the solution was removed, and the remaining solid layer was continuously instilled with 200 ml of decane and 100 ml of diethylaluminium chloride (1.0M). There, the temperature was raised to 60° C. (A-3 temperature) and maintained thereat for two hours. After the reaction, after stirring, the supernatant of the solution was removed, and it was twice washed with 600 ml of decane. To this, 200 ml of decane and 100 ml of TiCl$_4$ were added, followed by raising the temperature to 100° C. and maintaining thereat for two hours. After the reaction, it was cooled to room temperature and washed with 300 ml of hexane until the removal of free unreacted TiCl$_4$. The titanium content of the catalyst so produced was 8.5 wt %. The polymerization was carried out as in Example 1, results thereof are shown in Table 1.

Comparative Example 3

The precipitant was respectively produced in the same manner as Steps (i) and (ii) of Example 1. After stirring, the supernatant of the solution was removed, and the remaining solid layer was continuously instilled with 600 ml of chloroform (CHCl$_3$), followed by raising the temperature to 60° C. for reaction for one hour. Thereafter, it was cooled to room temperature, and after stirring, the supernatant of the solution was again removed, followed by washing twice with 600 ml of decane. To this, 200 ml of decane and 100 ml of TiCl$_4$ were added, followed by raising the temperature to 100° C. and maintaining thereat for two hours. After the reaction, it was cooled to room temperature and washed with 300 ml of hexane until the removal of free unreacted TiCl$_4$. The titanium content of the catalyst so produced was 5.5 wt %. The polymerization was carried out as in Example 1, and the results thereof are shown in Table 1.

TABLE 1

| | A-1 Compound | | A-2 Compound | | A-3 | A-4 Compound | | Amount of Ti in catalyst (wt %) | Activity (kg PE/ g of catalyst) | Bulk Density (g/ml) | Melting Index (g/10 min) |
|---|---|---|---|---|---|---|---|---|---|---|---|
| Example | Compound | Amount (ml) | Compound | Amount (ml) | Temp. ° C. | Compound | Amount (ml) | | | | |
| 1 | decane | 200 | DEAC | 100 | 60 | chloroform | 600 | 6.8 | 2.6 | 0.34 | 6.7 |
| 2 | decane | 200 | EADC | 100 | 60 | chloroform | 600 | 6.4 | 2.3 | 0.35 | 7.2 |

TABLE 1-continued

| Example | A-1 Compound Compound | A-1 Compound Amount (ml) | A-2 Compound Compound | A-2 Compound Amount (ml) | A-3 Temp. °C. | A-4 Compound Compound | A-4 Compound Amount (ml) | Amount of Ti in catalyst (wt %) | Activity (kg PE/ g of catalyst) | Bulk Density (g/ml) | Melting Index (g/10 min) |
|---|---|---|---|---|---|---|---|---|---|---|---|
| 3 | decane | 200 | EASC | 100 | 60 | chloroform | 600 | 7.2 | 2.7 | 0.35 | 5.4 |
| 4 | decane | 200 | DEAC | 100 | 40 | dichloromethane | 600 | 6.4 | 2.4 | 0.33 | 5.1 |
| 5 | decane | 200 | DEAC | 100 | 60 | chlorobenzene | 600 | 6.1 | 2.2 | 0.34 | 5.6 |
| 6 | decane | 200 | DEAC | 100 | 60 | dichloromethane | 600 | 6.5 | 2.6 | 0.35 | 6.2 |
| 7 | chloroform | 200 | DEAC | 100 | 60 | chloroform | 600 | 7.1 | 2.9 | 0.35 | 5.2 |
| 8 | decane | 200 | DEAC | 100 | 25 | dichloromethane | 900 | 5.8 | 2.5 | 0.36 | 7.8 |
| 9 | chloroform | 200 | EASC | 200 | 60 | chloroform | 900 | 8.1 | 2.8 | 0.36 | 4.6 |
| CE 1 | — | — | — | — | — | — | — | 5.4 | 1.8 | 0.36 | 28.9 |
| CE 2 | decane | 200 | DEAC | 100 | 60 | — | — | 8.5 | 1.3 | 0.34 | 5.2 |
| CE 3 | — | — | — | — | 60 | chloroform | 600 | 5.5 | 2.0 | 0.26 | 12.3 |

*DEAC: diethylaluminium chloride, EADC: ethylaluminium chloride, EASC: ethylaluminium sesquichloride, CE: comparative example.

As shown above, by way of the production process according to the present invention, it is possible to produce a new catalyst of high polymerization activity for homo- and co-polymerization of ethylene, which can produce polymers of high bulk density.

What is claimed is:

1. A method for producing a catalyst for homo- or co-polymerization of ethylene, which comprises the steps of:
   (i) preparing a magnesium solution by contact-reacting a halogenated magnesium compound with alcohol;
   (ii) producing a solid component by reacting said solution with an ester compound having at least one hydroxy group and a first silicone compound having at least one alkoxy group and then reacting thereto with a mixture of a first titanium compound and a second silicon compound; and
   (iii) reacting said solid component with an aluminium compound and a haloalkane compound, and then reacting thereto a second titanium compound wherein said first and second titanium compounds are the same or different.

2. The method for producing a catalyst for homo- or co-polymerization of ethylene according to claim 1, wherein said ester compound containing at least one hydroxy group is an unsaturated aliphatic acid ester having at least one hydroxy group, which is selected from the group consisting of 2-hydroxy ethylacrylate, 2-hydroxy ethylmethacrylate, 2-hydroxy propyl acrylate, 2-hydroxy propylmethacrylate, 4-hydroxy butylacrylate, and pentaerythritol tri-acrylate; an aliphatic monoester or polyester containing at least one hydroxy group, which is selected from the group consisting of 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl-lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, and diethyl bis-(hydroxymethyl)malonate; an aromatic ester having at least one hydroxy group, which is selected from the group consisting of 2-hydroxy ethyl benzoate, 2-hydroxy ethyl salicylate, methyl-4-(hydroxy methyl)benzoate, methyl-4-hydroxy benzoate, ethyl-3-hydroxy benzoate, 4-methyl salicylate, ethyl salicylate, phenyl salicylate, propyl-4-hydroxy benzoate, phenyl 3-hydroxy naphthanoate, mono-ethylene glycol monobenzoate, diethylene glycol benzoate, and triethylene glycol monobenzoate; or an alicyclic ester having at least one hydroxy group such as hydroxy butyl lactone; and wherein said first silicon compound having at least one alkoxy group is represented by a general formula of $R_nSi(OR)_{4-n}$, where R stands for a hydrocarbon having 1~12 carbons; and n for a natural number of 0~3.

3. The method for producing a catalyst for homo- or co-polymerization of ethylene according to claim 1, wherein said step (ii) titanium compound is represented by a general formula of $Ti(OR)_aX_{4-a}$, where R stands for an alkyl group having 1~10 carbons, X for a halogen atom, and a for a natural number of 0~4; and wherein said second silicon compound is represented by a general formula of $R_nSiCl_{4-n}$, where R for an alkyl group having 1~10 carbons; and n is a natural number of 0~4.

4. The method for producing a catalyst for homo- or co-polymerization of ethylene according to claim 3, wherein said step (ii) titanium compound is a 4-halogenated titanium, which is selected from the group consisting of $TiCl_4$, $TiBr_4$, and $TiI_4$; a 3-halogenated alkoxytitanium, which is selected from the group consisting of $Ti(OCH_3)Cl_3$, $Ti(OC_2H_5)Cl_3$, $Ti(OC_2H_5)Br_3$, and $Ti(O(i-C_4H_9))Br_3$; a 2-halogenated alkoxytitanium, which is selected from the group consisting of $Ti(OCH_3)_2Cl_2$, $Ti(OC_2H_5)_2Cl_2$, $Ti(O(i-C_4H_9))_2Cl_2$, and $Ti(OC_2H_5)_2Br_2$; and a tetralkoxytitanium, which is selected from the group consisting of $Ti(OCH_3)_4$, $Ti(OC_2H_5)_4$, and $Ti(OC_4H_9)_4$; or mixtures thereof; and wherein said second silicon compound is silicon tetrachloride, a trichlorosilane, which is selected from the group consisting of methyltrichlorosilane, ethyltrichlorosilane, and phenyltrichlorosilane; a dichlorosilane, which is selected from the group consisting of dimethyldichlorosilane, diethyldichlorosilane, diphenyldichlorosilane, and methylphenyldichlorosilane; or a monochlorosilane such as trimethylchlorosilane; or mixtures thereof.

5. The method for producing a catalyst for homo- or co-polymerization of ethylene according to claim 1, wherein said step (ii) titanium compound is titanium tetrachloride, and said second silicon compound is silicon tetrachloride.

6. The method for producing a catalyst for homo- or co-polymerization of ethylene according to claim 1, wherein the ratio of the mixture of said step (ii) titanium compound and said second silicon compound is 0.1~200 mol per one mole of said magnesium compound; and the molar ratio of step (ii) said titanium compound to said second silicon compound in ratio is 1:0.05~0.95.

7. The method for producing a catalyst for homo- or co-polymerization of ethylene according to claim 1, wherein aluminium compound is a trialkyl aluminium having an alkyl group of 1~6 carbons, which is selected from the group consisting of triethylaluminium and triisobutylaluminium; an aluminium compound having one or more halogens, which is selected from the group consisting of ethylaluminium dichloride, diethylaluminium chloride, and ethylaluminium sesquichloride; or the mixtures thereof.

8. The method for producing a catalyst for homo- or co-polymerization of ethylene according to claim 1, wherein said haloalkane compound is a haloalkane compound having 1~20 carbon atoms and one or more halogens, or the mixtures thereof.

* * * * *